US011499679B2

(12) United States Patent
Ando et al.

(10) Patent No.: US 11,499,679 B2
(45) Date of Patent: Nov. 15, 2022

(54) TANK STATE ESTIMATION METHOD AND TANK STATE ESTIMATION PROGRAM

(71) Applicant: NIPPON YUSEN KABUSHIKI KAISHA, Tokyo (JP)

(72) Inventors: Hideyuki Ando, Tokyo (JP); Yasuhiro Sudo, Tokyo (JP); Tatsuya Kojima, Tokyo (JP); Fumitaka Kimura, Tokyo (JP)

(73) Assignee: NIPPON YUSEN KABUSHIKI KAISHA, Tokyo (JP)

( * ) Notice: Subject to any disclaimer, the term of this patent is extended or adjusted under 35 U.S.C. 154(b) by 583 days.

(21) Appl. No.: 16/604,166

(22) PCT Filed: Apr. 10, 2017

(86) PCT No.: PCT/JP2017/014706
§ 371 (c)(1),
(2) Date: Oct. 10, 2019

(87) PCT Pub. No.: WO2018/189789
PCT Pub. Date: Oct. 18, 2018

(65) Prior Publication Data
US 2020/0158289 A1    May 21, 2020

(51) Int. Cl.
*F17C 13/02* (2006.01)
*B63B 71/00* (2020.01)
*B63B 25/16* (2006.01)

(52) U.S. Cl.
CPC .............. *F17C 13/02* (2013.01); *B63B 25/16* (2013.01); *B63B 71/00* (2020.01);
(Continued)

(58) Field of Classification Search
CPC .............. F17C 13/02; F17C 2203/0333; F17C 2221/033; F17C 2250/0408;
(Continued)

(56) References Cited

U.S. PATENT DOCUMENTS

2022/0170597 A1* 6/2022 Saha ....................... F17C 5/007

FOREIGN PATENT DOCUMENTS

EP           2772866 A1    9/2014
JP        201392162 A     5/2013
(Continued)

*Primary Examiner* — Devon Russell
(74) *Attorney, Agent, or Firm* — Soroker Agmon Nordman; Daniel Schatz; Sharone Godesh

(57) ABSTRACT

A tank state estimating method of estimating a state in a tank at a predetermined point in time on a sailing course of an LNG carrier is provided. The LNG carrier carrying LNG stored in the tank as a cargo. The tank state estimating method includes: a first step of acquiring information related to specification of the tank; a second step of acquiring information related to a state in the tank at a start point of a target section on the course; a third step of acquiring information on a predictive value of liquid fluctuation of the LNG in the tank during the section, the predictive value being obtained on a basis of a weather forecasting value during the section and information on the weather forecasting value; and a fourth step of calculating the state in the tank at an end point of the section by thermal transfer calculation based on thermodynamics on a basis of the information acquired in the first to third steps in assuming that a heat input to the tank during the section is used for vaporization of the LNG in the tank.

4 Claims, 3 Drawing Sheets

(52) U.S. Cl.
CPC .......................... *F17C 2203/0333* (2013.01); *F17C 2221/033* (2013.01); *F17C 2250/043* (2013.01); *F17C 2250/0408* (2013.01); *F17C 2250/0439* (2013.01); *F17C 2250/0447* (2013.01); *F17C 2270/0105* (2013.01)

(58) Field of Classification Search
CPC ....... F17C 2250/043; F17C 2250/0439; B63B 71/00; B63B 25/16
See application file for complete search history.

(56) References Cited

FOREIGN PATENT DOCUMENTS

| | | | | | |
|---|---|---|---|---|---|
| JP | 2015124860 | A | | 7/2015 | |
| KR | 20110024501 | A | * | 3/2011 | |
| KR | 20120124154 | A | * | 11/2012 | |
| KR | 2016126576 | A | * | 11/2016 | ............. B63B 25/16 |
| KR | 20220064156 | A | * | 5/2022 | |
| WO | WO-2010059307 | A1 | * | 5/2010 | ............. B63B 25/14 |
| WO | WO-2013061883 | A1 | * | 5/2013 | ............... G05D 9/12 |

* cited by examiner

TANK STATE ESTIMATION METHOD AND TANK STATE ESTIMATION PROGRAM

TECHNICAL FIELD

The present invention relates to a technique to estimate a state of a tank in which LNG (Liquefied Natural Gas) is stored, and more specifically, the present invention relates to an effective technique applied to a tank state estimating program and tank state estimating method, which are to be applied to a tank of an LNG carrier that carries LNG as a cargo.

BACKGROUND ART

In an LNG carrier that carries LNG as a cargo, there are factors for consideration peculiar to creation of a voyage plan due to characteristics of the LNG as the cargo. The LNG vaporizes at about −160° C. Thus, the LNG has a feature that it cannot be avoided that the LNG in a tank as the cargo gradually vaporizes due to a heat input from the outside or the like, for example.

As a result, a large quantity of LNG vaporizes in a case where temperature of the tank is high when the LNG is loaded into the tank of the LNG carrier at a loading port, for example. Thus, there is a restriction that the temperature in the tank has to be a predetermined temperature or lower to load the LNG. For this reason, the tank is to be cooled so that the tank becomes the predetermined temperature or lower when an LNG carrier arrives at the loading port. At this time, there is a possibility that the tank is damaged in a case where the temperature is lowered rapidly. Therefore, it is necessary to gradually cool the tank. Thus, an operation of cooling down (hereinafter, referred to also as "C/D") in which the tank is cooled in a planned manner is performed during a voyage to go toward the loading port.

In the C/D, by spraying LNG left in the tank (hereinafter, referred to also as "heel") into the tank, the tank is cooled by the heat of vaporization. Therefore, when the LNG carrier unloads the LNG at a discharging port, the LNG carrier does not unload all of the LNG, but unloads the LNG in a state where heel to be used in the C/D while going to a next loading port is left. At this time, by leaving a lot of heel, the operation of the C/D becomes easy. However, it is desirable for a customer to make heel smaller as much as possible in order not to reduce the amount of LNG that is the cargo. Such a scheme relating to the operation for C/D is also contained in the voyage plan.

As a technique related to creation of an operation plan of a storage tank in an LNG tanker related to reception, transportation, storage, and discharge of LNG, for example, Japanese Patent Application Publication No. 2013-92162 (Patent document 1) describes that an operation plan problem of the storage tank for LNG, which is expressed by a mixed-integer nonlinear programming problem, is alleviated to two kinds of plan problems including a mixed-integer linear programming problem in which nonlinear constraints are abstracted by linearly approximating a nonlinear expression in constraint conditions, and a continuous nonlinear programming problem in which integral constraints and mixed integral constraints containing a discrete variable in each constraint condition are abstracted. Patent document 1 also describes that a feasible solution that is a local optimum solution but is similar to a global optimum solution can be obtained by solving the respective alleviated programming problems alternately and repeatedly while constraint conditions are elaborated stepwise.

RELATED ART DOCUMENTS

Patent Documents

Patent Document 1: Japanese Patent Application Publication No. 2013-92162

SUMMARY OF THE INVENTION

Problems to be Solved by the Invention

For example, in order to automatically create or adjust a voyage plan of an LNG carrier including a scheme related to an operation of C/D as described above (when and how much LNG is to be sprayed), as a prerequisite, there is need to estimate a state in a tank (including a temperature and a pressure) at each point in time on a sailing course by calculation. However, in a case where this is to be calculated precisely, as described in Patent document 1, a very complicated and high-load calculating process is required. Therefore, conventionally, estimate of the state in the tank has not been executed by calculation, but has mainly been carried out on the basis of personality such as experience or skill of a captain, a navigation officer, or the like.

According to the technique described in Patent document 1, by relaxing complicity of the nonlinear programming problem related to the operation of the tank that stores the LNG, it is possible to obtain the solution with a practical calculation time. However, in the technique described in Patent document 1, a change in a state of the LNG due to fluctuation of ship hull (and the LNG in the tank) during a voyage is not considered. In a case where this point is considered, the nonlinear programming problem becomes more complicated, and a load on arithmetic processing for obtaining a solution becomes higher.

It is thus an object of the present invention to provide a tank state estimating method and a tank state estimating program that estimate a state of a tank, in which LNG is stored, in view of various kinds of elements including an influence of ship fluctuation of an LNG carrier during a voyage.

The foregoing and other objects, and new features of the present invention will become more apparent from description of the present specification and the appending drawings.

Means for Solving the Problem

An outline of representative invention of the present invention disclosed in the present application and the like will briefly be explained as follows.

A tank state estimating method according to a representative embodiment of the present invention is a tank state estimating method of estimating a state in a tank at a predetermined point in time on a sailing course of an LNG carrier, the LNG carrier carrying LNG stored in the tank as a cargo. The tank state estimating method includes: a first step of acquiring information related to specification of the tank; a second step of acquiring information related to a state in the tank at a start point of a target section on the course; a third step of acquiring information on a predictive value of liquid fluctuation of the LNG in the tank during the section, the predictive value being obtained on a basis of a weather forecasting value of the section and information on the weather forecasting value; and a fourth step of calculating the state in the tank at an end point of the section by thermal transfer calculation based on thermodynamics on a basis of the information acquired in the first to third steps by assuming that a heat input to the tank during the section is used for vaporization of the LNG in the tank.

Further, the present invention can also be applied to a tank state estimating program that causes a computer to execute the tank state estimating method described above.

Effects of the Invention

Effects obtained by representative invention of the present invention disclosed in the present application will briefly be explained as follows.

Namely, according to the representative embodiment of the present invention, it is possible to estimate a state of a tank, which stores LNG, in view of various kinds of elements including an influence of ship fluctuation of an LNG carrier during a voyage.

BRIEF DESCRIPTIONS OF THE DRAWINGS

DETAILED DESCRIPTION OF EMBODIMENTS

Figure 1:
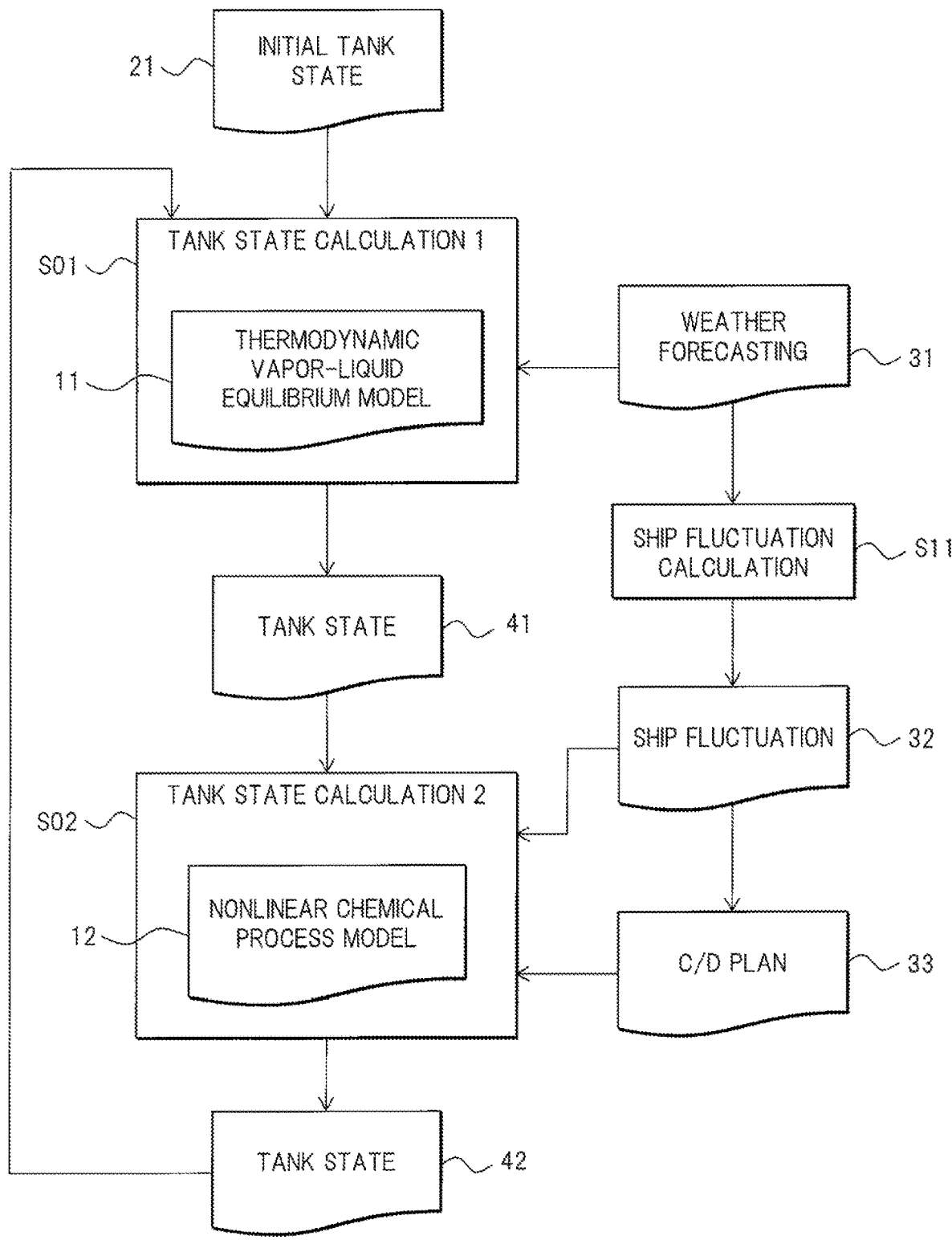
FIG. 1 is a flow diagram illustrating an outline of an example of a flow of processing to estimate a tank state according to a first embodiment of the present invention.

Hereinafter, embodiments of the present invention will be described in detail with reference to the drawings. Note that in all of the drawings for explaining the embodiment, the same reference numeral is generally assigned to the same unit, and its repeated explanation will be omitted. On the other hand, a component has been explained in a certain drawing while applying a reference numeral thereto is not illustrated again when another drawing is to be explained, but the element may be referred to by applying the same reference numeral thereto.

<Outline>

As described above, since LNG that is a cargo in an LNG carrier vaporizes at about −160° C., for example, there is a characteristic that slow vaporization of the LNG in a tank due to a heat input from the outside or the like cannot be avoided. Therefore, there are various kinds of unique factors for consideration in creation of a voyage plan, such as a C/D operation to cool a tank in advance so as to become a predetermined temperature or lower during a voyage to go toward a loading port of the LNG.

In addition to the C/D, a power source is obtained by burning a gas acquired by LNG being vaporized in the tank (Boil Off Gas: BOG) to rotate a turbine, for example. Further, the LNG in the tank may forcibly be vaporized to be used as fuel in place of burning of heavy oil that is a main fuel. By such a control, elements that could affect the voyage plan such as horsepower distribution or fuel consumption may change, and the amount of LNG that is the cargo may change. It is desirable for a customer (or an owner of the cargo) to carry LNG by the most economical voyage plan without reducing the LNG as much as possible while maintaining punctuality.

Further, in a case where burning of the BOG is set to a factor for consideration, a composition ratio of the BOG is thought not to be the same because a composition ratio of methane, ethane, and the like, which are components of the LNG, is different from that of the LNG in another cargo, for example. Further, even in case of the same LNG, it is thought that easiness of vaporization of methane, ethane, and the like, which are components of the LNG, is different from each other. Thus, it is thought that a composition ratio of the LNG also changes with the lapse of time, and as a result, the composition ratio of the BOG also changes. Therefore, it is thought that heat quantity obtained when the BOG is burned is also different from each other. By using this as a factor for consideration, the elements that could affect the voyage plan, such as fuel consumption, change.

As described above, in a case where the voyage plan is to be created or adjusted in view of these elements, as a prerequisite, there is need to estimate a state in the tank (hereinafter, referred to also as a "tank state") at each point in time on a sailing course by computation or calculation. Here, the "tank state" generally refers to a temperature in the tank. However, since the temperature can easily be acquired from Boyle-Charle's law by estimating a pressure thereof, in place of or in addition to the temperature, the "tank state" may refer to the pressure. Moreover, the "tank state" may contain information on composition of the LNG in the tank (for example, a ratio of methane, ethane, or the like).

Weather and spray of the LNG during the C/D are considered as elements that influence on the tank state on the sailing course. Information on the weather contains information on wind or wave that affects fluctuation of a ship hull (and the LNG in the tank) in addition to information on an air temperature, solar radiation, or a sea water temperature that affects a stationary heat input to the tank, for example. Information on the spray of the LNG contains information on a mass flow rate of the LNG to be sprayed.

First Embodiment

FIG. 1 is a flow diagram illustrating an outline of an example of a flow of processing to estimate a tank state according to a first embodiment of the present invention. All or a part of a series of processes related to the flow may be implemented as a program that a dedicated or general-purpose computer provided with a CPU (Central Processing Unit) and a memory is caused to execute, or may be implemented as hardware such as an apparatus configured by an integrated circuit or the like.

In the present embodiment, in order to estimate the tank state, a tank state 42 at a certain point in time is estimated by executing a two-stage calculating process including tank state calculation 1 (Step S01) and tank state calculation 2 (Step S02) on the basis of predetermined input information as illustrated in FIG. 1. Here, for example, an initial tank state 21, which is a tank state at a reference point on a sailing course in a voyage plan, is used as an input to calculate the tank state 42 at an end point of a certain section that includes the reference point as a start point. Then, by repeating a process to use this tank state 42 as an input at a start point of a next (or the following) section to calculate the tank state 42 at an end point of the next section until a ship arrives at a destination, the tank state 42 at the destination is estimated.

Note that a section or sections from the reference point to the destination may be set by dividing a distance thereof by every fixed time or every fixed distance, or dividing it by arbitrary spots. By setting division of the sections finely, it is possible to estimate the tank state 42 at the destination more accurately. However, since a calculation load becomes higher to that extent, it is desirable to set the division to fineness to an extent that necessary accuracy can be acquired. As the initial tank state 21 at the reference point, actual measurement values measured by sensors and the like installed at respective places of the tank and/or a ship hull are used basically.

In the tank state calculation 1 (Step S01), a tank state 41 at an end point of a target section is estimated by predetermined equilibrium calculation based on thermodynamics (a thermodynamic vapor-liquid equilibrium model 11). For example, weather forecasting 31 containing information on stationary heat inputs such as air temperature, sunshine, or sea water temperature is used, as inputs, for the tank state at a start point of the target section (that is, the initial tank state 21 or the tank state 42 at an end point of a previous section of the target section) to calculate the tank state 41 after reaching equilibrium by the thermodynamic vapor-liquid equilibrium model 11. Note that the weather forecasting 31 can be acquired automatically or manually from weather information service of the outside, for example.

In the thermodynamic vapor-liquid equilibrium model 11, the state in the tank is modeled as a vapor-liquid equilibrium state between liquid LNG and gaseous BOG by a predetermined calculation formula using a state equation of general thermodynamics or Raoult's law. It is possible to execute calculation by the thermodynamic vapor-liquid equilibrium model 11 comparatively easily.

On the other hand, in the tank state calculation 2 (Step S02), the tank state is estimated by a nonlinear model (a nonlinear chemical process model 12) in view of special factors in the LNG carrier, that is, a chemical influence that fluctuation and/or stirring of the LNG in the tank exerts on vaporization of the LNG associated with fluctuation of the ship hull (and the tank) and influence of artificial spray of the LNG according to an operation scheme of the C/D. Here, with respect to the tank state 41 that is the calculation result at Step S01, ship fluctuation 32 containing information on behavior and motion of the ship hull and the tank, and a C/D plan 33 that is the operation scheme of the C/D are further used as inputs to calculate the tank state 42 in view of fluctuation of the LNG in the tank and influence of spray of the LNG by the C/D by the nonlinear chemical process model 12.

Information on the ship fluctuation 32 can be acquired by using a known simulation technique such as a strip method, for example. In the example illustrated in FIG. 1, the weather forecasting 31, information on specification of the ship hull and the tank (not illustrated in FIG. 1), and the like are used as inputs to execute simulation by ship fluctuation calculation (Step S11) in the processing flow and predict the tank state. However, this method may be configured so that a simulation result executed at the outside is acquired and inputted thereto.

Information on the C/D plan 33, that is, information on when and how much the LNG is to be sprayed is directly received from a captain or a navigation officer as inputs, or is acquired by reading information stored in a file or the like in advance. Since behavior or motion of the ship hull and the tank may affect the operation of the C/D, this method may be configured so as to refer to the information on the ship fluctuation 32 when the C/D plan 33 is to be created.

As explained above, according to tank state estimating method of the first embodiment of the present invention, the processing flow illustrated in FIG. 1 allows the tank state 41 of the LNG carrier to be estimated by calculation based on the comparatively simple thermodynamic vapor-liquid equilibrium model 11. Moreover, it is possible to estimate the tank state 42 more precisely by calculation based on the nonlinear chemical process model 12 in view of the information on the ship fluctuation 32 or the C/D plan 33.

Note that in the nonlinear chemical process model 12, an influence due to a change in behavior at a chemical reaction level of the LNG associated with fluctuation and/or stirring of the LNG in the tank and spray of the LNG during the C/D that is executed not regularly, but intermittently is modeled by calculation formulas. Therefore, the nonlinear chemical process model 12 becomes a very complicated nonlinear calculation model that can precisely presume the tank state 42. It is thought that a load of a calculating process becomes comparatively high.

Second Embodiment

In a tank state estimating method according to a second embodiment of the present invention, a tank state can be acquired by linear computation by modeling an influence by ship fluctuation or spray of LNG during C/D on the basis of calculation models of thermal transfer and two-phase vapor-liquid flow based on thermodynamics. This makes it possible to calculate a tank state with necessary and sufficient accuracy in a short time on a low load while taking into consideration an influence by the ship fluctuation or spray of the LNG during the C/D.

<Processing Flow>

Figure 2:
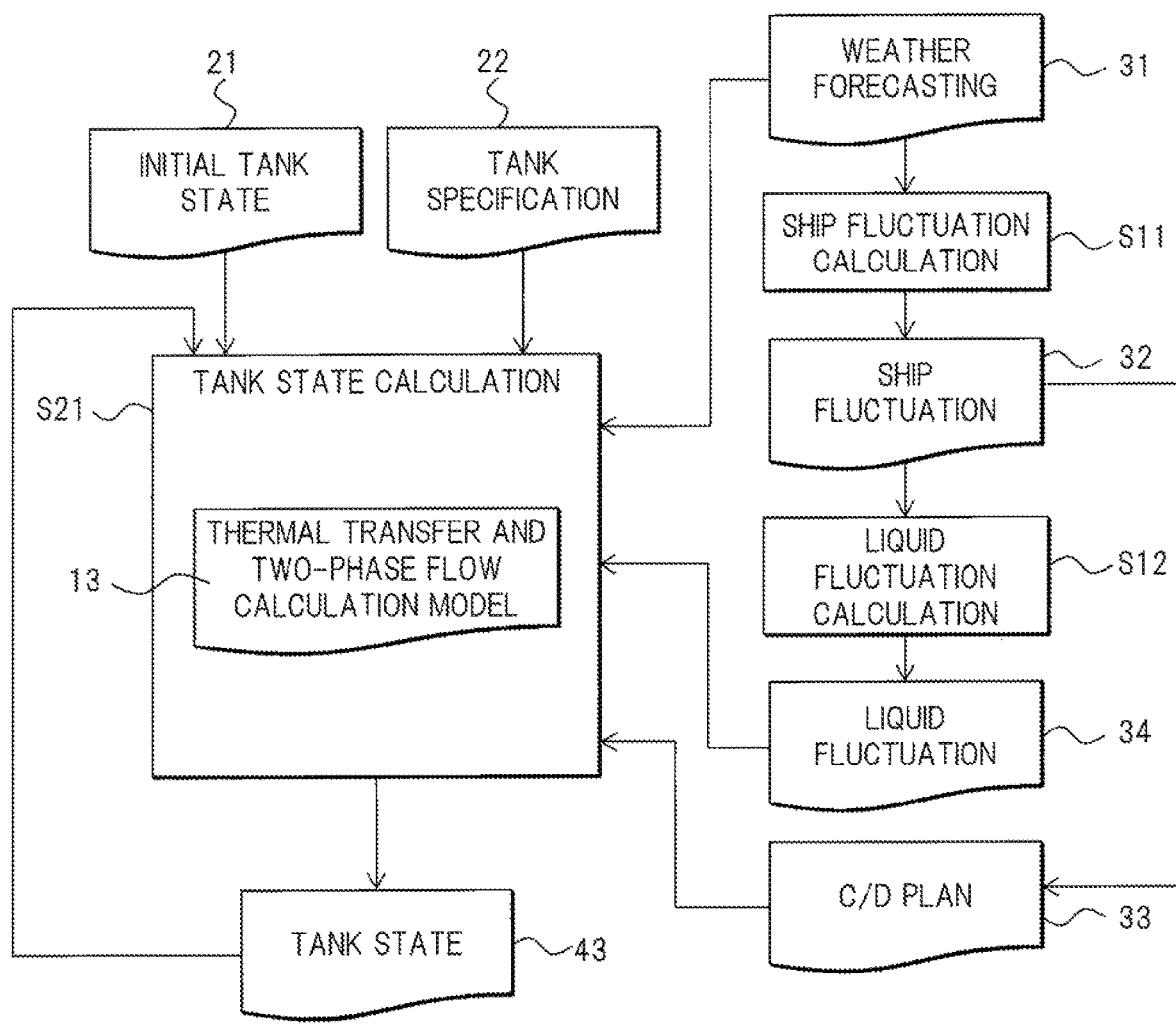
FIG. 2 is a flow diagram illustrating an outline of an example of a flow of processing to estimate a tank state according to a second embodiment of the present invention.

FIG. 2 is a flow diagram illustrating an outline of an example of a flow of processing to estimate a tank state according to the second embodiment of the present invention. As well as the case of the processing flow illustrated in FIG. 1 according to the first embodiment described above, all or a part of processes related to the flow may be implemented as a program that a dedicated or general-purpose computer provided with a CPU and a memory is caused to execute, or may be implemented as hardware such as an apparatus configured by an integrated circuit or the like.

In the present embodiment, unlike the example illustrated in FIG. 1, in order to estimate the tank state, a tank state 43 at a certain point in time is estimated by executing a one-stage calculating process of tank state calculation (Step S21) on the basis of predetermined input information. Then, as well as the example illustrated in FIG. 1, for example, an initial tank state 21 at a reference point on a sailing course in a voyage plan is used as an input to calculate the tank state 43 at an end point of a certain section that includes the reference point as a start point. Then, by repeating a process to use this tank state 43 as an input at a start point of a next (or the following) section to calculate the tank state 43 at an end point of the next section until a ship arrives at a destination, the tank state 43 at the destination is estimated.

In the tank state calculation (Step S21), the tank state 43 is estimated by predetermined thermal transfer calculation based on thermodynamics (a thermal transfer and two-phase flow calculation model 13). For example, with respect to information on the tank state at a start point of a target section (that is, the initial tank state 21 or the tank state 43 at an end point of a previous section against the target section) and tank specification 22 containing static information such as a shape of a tank, a size of steel material, or a physical property of the tank, information on each of weather forecasting 31, liquid fluctuation 34, and a C/D plan 33 is used as an input to calculate the tank state 43 by the thermal transfer and two-phase flow calculation model 13. Note that the information on the tank specification 22 is acquired by first reading information recorded in a setting file or the like in advance once, for example, and there is thus no need to acquire the information on the tank specification 22 every time when the processing flow is repeatedly executed.

The information on the liquid fluctuation 34 can be acquired by using a known simulation technique such as a finite difference method on the basis of the information on the ship fluctuation 32 and the like, for example. In the example illustrated in FIG. 2, the information on the ship fluctuation 32 and the like are used as inputs to execute simulation by liquid fluctuation calculation (Step S12) in the processing flow and predict the tank state. However, this method may be configured so that a simulation result executed at the outside is acquired and inputted thereto. With respect to the information on the ship fluctuation 32, as well as the example illustrated in FIG. 1 according to the first embodiment, this method may be configured so that a simulation result executed at the outside is acquired in place of prediction by the ship fluctuation calculation (Step S11) in the processing flow.

<Thermal Transfer and Two-Phase Flow Calculation Model>

In the present embodiment, as described above, the influence by the ship fluctuation and spray of the LNG during the C/D are also treated as a balance of heat quantity by thermal transfer calculation based on thermodynamics. They are uniformly modeled together with information on a stationary heat input acquired from the weather forecasting 31.

Figure 3:
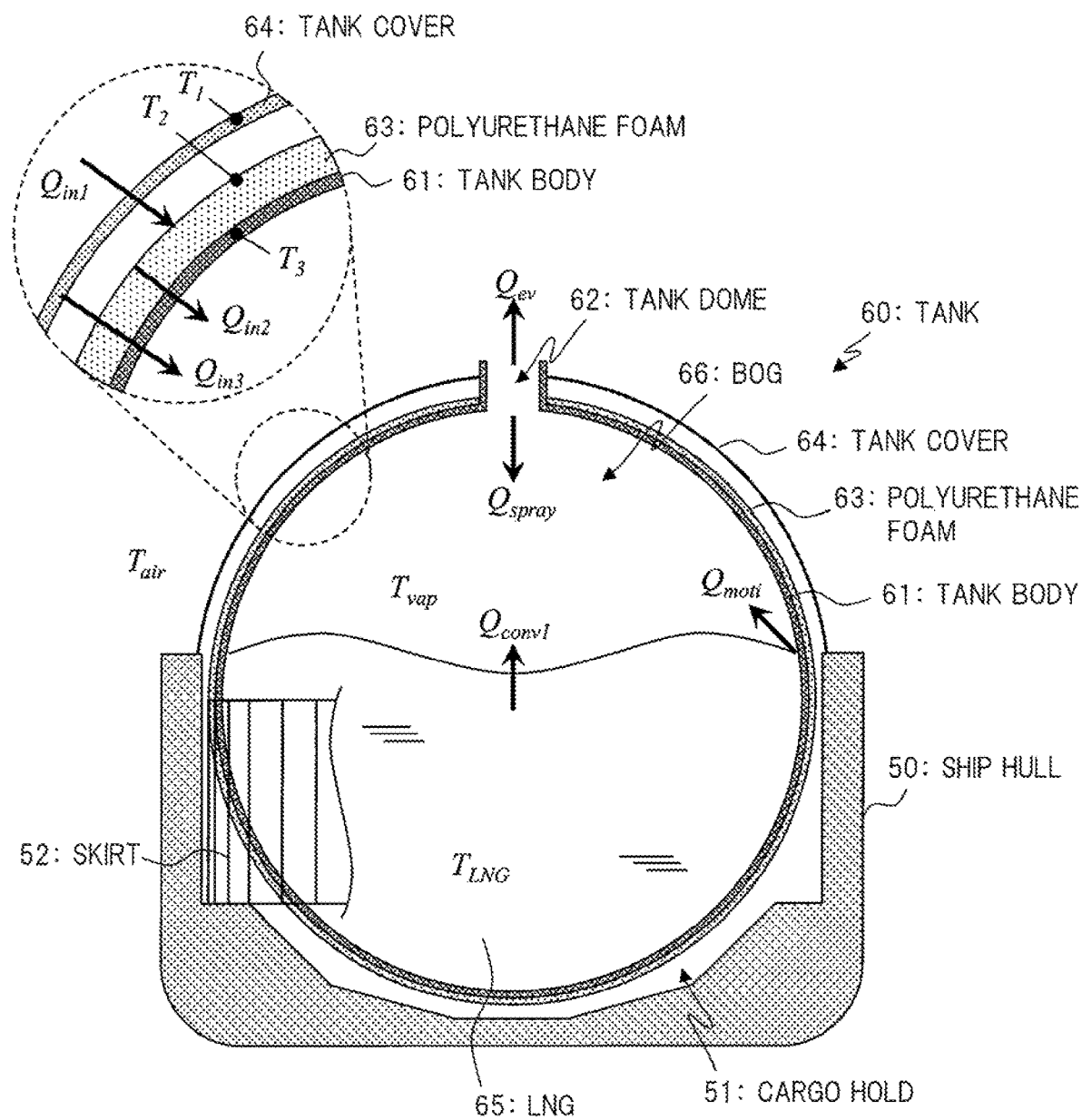
FIG. 3 is a view schematically illustrating an example of calculation models of thermal transfer and two-phase flow based on thermodynamics according to the second embodiment of the present invention.

FIG. 3 is a view schematically illustrating an example of a concept of a calculation model of thermal transfer and two-phase flow (the thermal transfer and two-phase flow calculation model 13) based on thermodynamics according to the present embodiment. FIG. 3 illustrates a portion of a tank 60 (a spherical tank in the example illustrated in FIG. 3), which stores LNG, in an LNG carrier by using a cross-sectional view based on a surface perpendicular to a line connecting a stem to a stern.

The tank 60 has a tank body 61 formed of aluminum alloy or steel material that withstands very low temperature of LNG 65. The tank body 61 has a tank dome 62 for a piping and a feeding/discharging port at the top thereof, and the whole spherical shape is coated by polyurethane foam 63 as heat insulating material. Further, a portion exposed to an upper portion of a ship hull 50 is covered by a tank cover 64 formed of metal or the like. The inside of the tank body 61 is filled with the LNG 65 as heel, a BOG 66 obtained by vaporization of the LNG 65, and the air.

In the spherical tank body 61 with a structure independent from the ship hull 50, in order to minimize intrusion of heat, only the vicinity of the equator of the tank body 61 is supported by a structure such as a skirt 52 with respect to the ship hull 50 so as to be in contact with each other. A space between the ship hull 50 and the tank body 61 is a cargo hold 51. An operation of the C/D is basically executed during a voyage to go toward a loading port. The example illustrated in FIG. 3 indicates that the LNG 65 as the heel left for the C/D is stored in the tank 60 and the cargo hold 51 is a space.

In the present embodiment, it is assumed that a heat input given to the tank 60 is completely used as latent heat when the LNG 65 vaporizes to become the BOG 66. Namely, in the example illustrated in FIG. 3, in a case where the heat input given to the tank 60 is $Q_{in}$ and heat quantity consumed for vaporization is $Q_{ev}$, it is assumed that $Q_{in} = Q_{ev}$.

Here, as heat quantity thought as constituting $Q_{in}$, for example, there are heat quantity ($Q_{in1}$) by sunshine, heat quantity ($Q_{in2}$, $Q_{in3}$, and the like) given from a structure of each layer of the tank 60 (including the tank body 61, the polyurethane foam 63, and the tank cover 64), heat quantity ($Q_{conv1}$) given from the LNG 65, heat quantity ($Q_{mot1}$) given by liquid fluctuation and/or stirring of the LNG 65 associated with the ship fluctuation, and heat quantity ($Q_{spray}$) given (or drained) by spray during the C/D.

$Q_{in1}$, $Q_{in2}$, $Q_{in3}$, and $Q_{conv1}$ of them can be calculated on the basis of differences among temperatures (for example, $T_{air}$, $T_{LNG}$, $T_{vap}$, $T_1$, $T_2$, and $T_3$) that are actually measured at the tank 60 and the respective neighboring spots, for example. Moreover, in the present embodiment, $Q_{mot1}$ associated with liquid fluctuation is also calculated on the basis of a temperature difference (for example, between $T_3$ and $T_{LNG}$). This makes it possible to obtain changes in a phase and composition of the LNG 65 associated with ship fluctuation (liquid fluctuation) from shift of the heat quantity.

$Q_{spray}$ associated with the spray can be calculated on the basis of a mass flow rate of the sprayed LNG 65, for example. Similarly, $Q_{ev}$ can also be calculated on the basis of a used flow rate of the BOG 66, for example.

In the calculation as described above, there is only a temperature change ΔT in the tank body 61 as an unknown parameter. Thus, it can be seen that this parameter can be obtained without a complicated calculating process.

As explained above, according to the tank state estimating method of the second embodiment of the present invention, it is possible to calculate the tank state 43 on the basis of the linear computation by modeling the influence by the ship fluctuation or spray of the LNG during the C/D by the thermal transfer calculation based on the thermodynamics. This makes it possible to estimate the tank state 43 with necessary and sufficient accuracy in a short time on a low load while taking into consideration an influence by the ship fluctuation or spray of the LNG during the C/D.

As described above, the invention made by inventors of the present application has been described specifically on the basis of the embodiment. However, the present invention is not limited to the embodiment described above, and it goes without saying that the present invention may be modified into various forms without departing from the substance thereof. For example, the embodiment described above has been explained in detail for explaining the present invention clearly. The present invention is not necessarily limited to one that includes all configurations that have been explained. Further, a part of the configuration of any embodiment can be replaced by the configuration of the other embodiment, and the configuration of any embodiment can also be added to the configuration of the other embodiment. Further, a part of the configuration of each of the embodiments can be added with the other configuration, deleted or replaced thereby.

Further, a part or all of the respective configuration, the functions, the processing units, and processing means described above may be realized by hardware by designing it with an integrated circuit, for example. Further, the respective configuration described above and the functions may be realized by software by interpreting programs to realize and execute each of the functions by means of a processor. Information on the programs, the tables, and the files to realize the respective functions can be placed in a recording apparatus such as a memory, a hard disk, or an SSD (Solid State Drive), or a recording medium such as an IC card, an SD card, or a DVD.

INDUSTRIAL APPLICABILITY

The present invention is usable for a tank state estimating program and a tank state estimating method that are applied to a tank of an LNG carrier that carries LNG as a cargo.

REFERENCE SIGNS LIST

11 . . . thermodynamic vapor-liquid equilibrium model, 12 . . . nonlinear chemical process model, 13 . . . thermal transfer and two-phase flow calculation model, 21 . . . initial tank state, 22 . . . tank specification, 31 . . . weather forecasting, 32 . . . ship fluctuation, 33 . . . C/D plan, 41, 42, 43 . . . tank state, 50 . . . ship hull, 51 . . . cargo hold, 52 . . . skirt, 60 . . . tank, 61 . . . tank body, 62 . . . tank dome, 63 . . . polyurethane foam, 64 . . . tank cover, 65 . . . LNG, 66 . . . BOG.

The invention claimed is:

1. A tank state estimating method of estimating temperature or pressure in a tank as a state in the tank at a predetermined point in time on a sailing course of an LNG (Liquefied Natural Gas) carrier, the LNG carrier carrying LNG stored in the tank as a cargo, the tank state estimating method comprising:
   a first step of acquiring information containing a shape, a size, and a physical property value other than the shape and the size of the tank as information on specification of the tank;
   a second step of acquiring an actual measurement value measured by a sensor or a calculation value at an end point of a previous section of a target section on the sailing course as information on a state in the tank at a start point of the target section on the sailing course;
   a third step of acquiring information on an air temperature, solar radiation, a sea water temperature, wind, or wave as a weather forecasting value during the section;
   a fourth step of acquiring information on ship fluctuation by ship fluctuation calculation based on the weather forecasting value and specification information of a ship hull of the LNG carrier, the ship fluctuation calculation being simulation calculation for fluctuation of the ship hull, the information on ship fluctuation being information on behavior or motion of the ship hull;
   a fifth step of acquiring information on liquid fluctuation by liquid fluctuation calculation as simulation calculation based on the information on ship fluctuation and the information on the specification of the tank, the information on the liquid fluctuation being information on a predictive value of the liquid fluctuation of the LNG in the tank during the sailing course section;
   a sixth step of acquiring information containing a mass flow rate of the LNG to be sprayed, as information on a plan of an operation of cooling down the tank by spraying the LNG in the tank using the LNG left in the tank enduring the sailing course; and
   a seventh step of calculating the state in the tank at an end point of the sailing course section by thermal transfer calculation based on thermodynamics based on the information acquired in the first to sixth steps,
   wherein the seventh step is a step of estimating the state in the tank at the end point by a thermal transfer and two-phase flow calculation model,
   wherein the thermal transfer and two-phase flow calculation model is a linear model that treats, as a balance of heat quantity by the thermal transfer calculation based on thermodynamics, a chemical influence that fluctuation and stirring of the LNG in the tank exerts on vaporization of the LNG associated with fluctuation of the ship hull of the LNG carrier and an influence of spraying the LNG in the tank according to the information on the plan of the operation of cooling down, and
   wherein the thermal transfer calculation based on thermodynamics is a calculation in assuming a heat input given to the tank during the sailing course section is completely used as latent heat when the LNG in the tank vaporizes to become Boil Off Gas (BOG).

2. A tank state estimating program for causing a computer to execute processes for estimating temperature or pressure in a tank as a state in the tank at a predetermined point in time on a sailing course of an LNG (Liquefied Natural Gas) carrier, the LNG carrier carrying LNG stored in the tank as a cargo,
   wherein the processes include:
   a first process for acquiring information containing a shape, a size, and a physical property value other than the shape and the size of the tank as information on specification of the tank;
   a second process for acquiring an actual measurement value measured by a sensor or a calculation value at an end point of a previous section of a target section on the sailing course as information on a state in the tank at a start point of the target section on the sailing course;
   a third process for acquiring information on an air temperature, solar radiation, a sea water temperature, wind, or wave as a weather forecasting value during the section;
   a fourth process of acquiring information on ship fluctuation by ship fluctuation calculation based on the weather forecasting value and specification information of a ship hull of the LNG carrier, the ship fluctuation calculation being simulation calculation for fluctuation of the ship hull, the information on ship fluctuation being information on behavior or motion of the ship hull;
   a fifth process of acquiring information on liquid fluctuation by liquid fluctuation calculation as simulation calculation based on the information on ship fluctuation and the information on the specification of the tank, the information on the liquid fluctuation being information on a predictive value of the liquid fluctuation of the LNG in the tank during the sailing course section;
   a sixth process of acquiring information containing a mass flow rate of the LNG to be sprayed as information on a plan of an operation of cooling down the tank by spraying the LNG in the tank using the LNG left in the tank enduring the sailing course; and
   a seventh process for calculating the state in the tank at an end point of the sailing course section by thermal transfer calculation based on thermodynamics based on the information acquired in the first to sixth processes,
   wherein the seventh process is a process of estimating the state in the tank at the end point by a thermal transfer and two-phase flow calculation model,
   wherein the thermal transfer and two-phase flow calculation model is a linear model that treats, as a balance of heat quantity by the thermal transfer calculation based on thermodynamics, a chemical influence that fluctuation and stirring of the LNG in the tank exerts on vaporization of the LNG associated with fluctuation of the ship hull of the LNG carrier and an influence of spraying the LNG in the tank according to the information on the plan of the operation of cooling down, and wherein the thermal transfer calculation based on thermodynamics is a calculation in assuming a heat input given to the tank during the sailing course section is completely used as latent heat when the LNG in the tank vaporizes to become Boil Off Gas (BOG).

3. The tank state estimating method according to claim 1, wherein the heat input given to the tank has heat quantity indicated by the weather forecasting value, heat quantity given from a structure of each layer of the tank, heat quantity given from the LNG, heat quantity given by liquid fluctuation of the LNG in the tank associated with the ship fluctuation, and heat quantity given by spraying the LNG, wherein the heat quantity indicated by the weather forecasting value, the heat quantity given from the structure of each layer of the tank, the heat quantity given from the LNG, and the heat quantity given by the liquid fluctuation of the LNG in the tank associated with the ship fluctuation are calculated based on a difference between actual measurement values of temperature of each location at the tank and its respective neighboring locations, and wherein the heat quantity given by spraying the LNG is calculated based on a mass flow rate of the sprayed LNG.

4. A tank state estimating method of estimating temperature or pressure in a tank as a state in the tank at a predetermined point in time on a sailing course of an LNG (Liquefied Natural Gas) carrier, the LNG carrier carrying LNG stored in the tank as a cargo, the tank state estimating method comprising:

a first step of acquiring an actual measurement value measured by a sensor or a calculation value at an end point of a previous section of a target section on the sailing course as information on a state in the tank at a start point of the target section on the sailing course;

a second step of acquiring information on an air temperature, solar radiation, a sea water temperature, wind, or wave as a weather forecasting value during the section;

a first calculating step of inputting the information acquired in the first step and the information acquired in the second step to estimate a first tank state at an end point of the sailing course section based on a thermodynamic vapor-liquid equilibrium model;

a third step of acquiring information on ship fluctuation by ship fluctuation calculation based on the weather forecasting value and specification information of a ship hull of the LNG carrier, the ship fluctuation calculation being simulation calculation for fluctuation of the ship hull, the information on ship fluctuation being information on behavior or motion of the ship hull;

a fourth step of acquiring information containing a mass flow rate of the LNG to be sprayed as information on a plan of an operation of cooling down the tank by spraying the LNG the tank using the LNG left in the tank during the sailing course; and a second calculating step of inputting the first tank state, the information acquired in the third step, and the information acquired in the fourth step to estimate a second tank state as a state in the tank at the end point of the section based on a nonlinear chemical process model as thermal transfer calculation based on thermodynamics, wherein the thermodynamic vapor-liquid equilibrium model is modeled by a general calculation formula of the thermodynamics assuming that a tank state is a vapor-liquid equilibrium state between the LNG, which is liquid, and Boil Off Gas (BOG), which is gas, and wherein the nonlinear chemical process model is a nonlinear model that considers a chemical influence that fluctuation and stirring of the LNG in the tank exerts on vaporization of the LNG associated with fluctuation of the ship hull of the LNG carrier and an influence of spraying the LNG in the tank according to the information on the plan of the operation of cooling down.

* * * * *